US012343887B1

(12) United States Patent
Bogardus

(10) Patent No.: US 12,343,887 B1
(45) Date of Patent: Jul. 1, 2025

(54) SPRINGLESS OUT-THE-FRONT KNIFE

(71) Applicant: Kellen Bogardus, Aberdeen, MD (US)

(72) Inventor: Kellen Bogardus, Aberdeen, MD (US)

( * ) Notice: Subject to any disclaimer, the term of this patent is extended or adjusted under 35 U.S.C. 154(b) by 0 days.

(21) Appl. No.: 19/006,771

(22) Filed: Dec. 31, 2024

Related U.S. Application Data

(60) Provisional application No. 63/657,313, filed on Jun. 7, 2024.

(51) Int. Cl.
*B26B 1/08* (2006.01)
*B26B 1/10* (2006.01)

(52) U.S. Cl.
CPC . *B26B 1/08* (2013.01); *B26B 1/10* (2013.01)

(58) Field of Classification Search
None
See application file for complete search history.

(56) References Cited

U.S. PATENT DOCUMENTS 1,434,388 A * 11/1922 Hughes ..................... B26B 1/08 30/162
10,981,284 B2 * 4/2021 Delplanche ............... B26B 1/10
2012/0036721 A1 * 2/2012 McHenry .................. B26B 1/08 30/162
2021/0023725 A1 * 1/2021 Buerk ....................... B26B 5/00
2021/0268671 A1 * 9/2021 Buerk ....................... B26B 1/08
2021/0276204 A1 * 9/2021 Marfione .................. B26B 1/10
2024/0300127 A1 * 9/2024 Vorhis ....................... B26B 5/00

* cited by examiner

*Primary Examiner* — Hwei-Siu C Payer
(74) *Attorney, Agent, or Firm* — Gottlieb, Rackman & Reisman, PC

(57) ABSTRACT

A knife includes a two-part handle that form a cavity therebetween and a blade with an integral tang. The blade is configured to be moveable longitudinally between an open position and a closed position. In a closed position, pressure is applied to the blade tang, the blade travels about the cavity of the handle and extends through an opening at the front of the handle. The blade is held in the open position by a lock that is disengaged by an actuator. In the closed position, the blade is fixed within the handle. An opening at the rear of the handle exposes the blade tang in the closed position.

15 Claims, 16 Drawing Sheets

14

10
70
78
72
10
74
75
74
75
78
70
24
44

SPRINGLESS OUT-THE-FRONT KNIFE

CROSS-REFERENCE TO RELATED APPLICATION

This patent application claims benefit to U.S. Provisional Patent Application No. 63/657,313, filed Jun. 7, 2024, which is hereby incorporated by reference in its entirety as part of the present disclosure.

FIELD OF THE INVENTION

The present disclosure relates generally to knives, and more specifically to an out-the-front knife that is deployable axially from within a handle by applying a force to a blade tang and retractable within the handle.

BACKGROUND OF THE INVENTION

Out-the-front knives (OTF), which include manually deployable blades and automatically deployable blades (e.g., switchblades) via an assistance mechanism, are found widely across the knife industry in many types, but can be grouped into three major categories that share different applications.

The first category of OTF knives is manually deployable knives. Deployment of manual OTF knives commonly occurs via a button attached to a tang of a blade protruding through a slot in a handle of a knife that an operator slides to deploy the blade. This button is usually the locking mechanism or can be an actuator of the locking mechanism. To retract the blade of a manual OTF knife, the button is pushed down and slid backwards into the handle along with the blade. This system is often found on small utility knives. However, manually deployed knifes have several drawbacks. For example, the operator is required to contact the blade through a full axial travel from the closed position to the open position and from the open position to the closed position and the operator's hand position on the handle through this range of motion is often awkward leading to their operation being easier with two hands. In addition, the locks on current manually deployed knives are often weak due to the need to accommodate the deployment slot around the mechanism, resulting in a small contact area and a frame and mechanism that compromises in structural rigidity.

The second category of OTF knives is "single-action" knives. A single-action knife is a switchblade that has a spring or other mechanism that is configured to store potential energy that is attached to the knife blade. The spring can be triggered by a button, lever, or other mechanism to release a lock holding the blade in a closed position inside the handle of a knife and in turn to deploy the blade to the open position. Once open, the lock is released, the blade is retracted manually by a sliding lever or attached tab back to the closed position, re-energizing the deployment mechanism. Although single-action knives are easily deployable, closing the blade can be awkward and is essentially impossible to do with a single hand. Additionally, the spring of a single-action knife is always under a highest point of tension when the knife is in the closed position, leading to potential long-term weakening of the spring or even failure. Finally, as noted above, single-action knives are switchblades, which fall under many bans relating to ownership and use.

The third category of OTF knives is referred to as "double-action" OTF knives. These knives are similar to the single-action knife described previously, except that they open and close automatically with a single switch. A double-action knife has a sliding actuator that is connected by a tab to an internal sliding frame that has one or more axial springs. Each end of the spring is attached to a tab that is either engaged on the sliding frame or the tang of the blade. As the slider is pushed forward, the spring is pulled to tension until an angled tab on the slider disengages a lock holding the blade in the closed position. The tension on the spring then deploys the blade which locks into an open position while moving the spring to a forward position with the front tab being contacted by the blade tang. When the knife is closed, the identical sequence of events happen as the slider is slid back to build up tension in the spring until releasing the front lock and allowing the spring to move the blade back to the closed position. Due to frames being engineered more rigidly and having lock mechanisms that are designed to work against heavy load or shock, double-action OTF knives are very strong. Double-action OTF knives are more straightforward to use than single-action OTF knives which has led to these knives being adopted much more than single-action knives. Current standard design fora knife of this type involves several sliding internal parts which cause inherent friction during movement. Therefore, the only reliable way for a double-action knife to be functional in long-term is to incorporate springs that have a high tension. However, the inclusion of high-tension springs may result in some people having a hard time deploying double-action knives, and even those with stronger hands can find it tiring to deploy the knife repeatedly. Moreover, like single-action OTF knives, double-action OTF knives are switchblades and as noted above, ownership and use is restricted.

Of the current categories of OTF knives that exist, while manual knives that do not face the legality challenges of switchblades, they are not easily manipulatable between an open and closed position, and are not as strong as single-action and double-action OTF knives. While single-action and double-action OTF knives are easier to deploy and stronger than manual knives, due to the combination of strict laws, awkward closing mechanisms, and potential unreliability, single-action OTFs are rarely used outside of being collectors' pieces, and double-action OTF knives are only usable in areas that do not have restrictions on automatic knives. In view of the above, there is a need for an improved manual OTF knife, not only in switchblade-restricted areas, but in general that is not only structurally sound but also easy, fast, and enjoyable to manipulate.

SUMMARY OF THE INVENTION

The present invention generally relates to a knife that includes a handle and a blade. In an embodiment, the handle is comprised of two pieces that are combined to form a cavity therebetween that has an opening at both a first end and a second end and cutouts for the blade and other mechanical components. The blade is configured to retract inside the handle in a closed position and to extend to outside of the handle in an open position. The blade has a first edge and can include a second edge on the face opposite the first edge. A lock in the rear of the handle interfaces the blade tang in the closed position, and a lock in the front of the handle interfaces the blade tang in the open position. A button is connected on the outside of the handle which slides axially. The button is rigidly connected to an internal slider tensioned by a spring. A lever is contained within the handle which interfaces with the slider and front lock. A bar or a switch arm with curved ends moves axial to the handle and is pushed by a pin on the blade tang between a forwards and a rearwards position. The bar selectively restricts movement of the front and rear locks to assist the mechanical operation.

In an embodiment, an axle is mounted at the top of the handle and is moveable axially about the handle. A cover plate or bridge forms a track for the axle and contains detents at each end.

When the blade of the knife is in the closed position, the user of the knife can apply pressure to the tang of the blade through the rear handle cutout which in turn applies pressure to the rear lock. The rear handle lock is tensioned by a coil spring and rotates about a point at its rear. The rear lock has a surface that interfaces slidably with an adjoining surface on the blade. Enough tension causes the friction and spring pressure of said interface to be overcome, allowing the user's thumb to impart inertial momentum upon the blade while still in the closed position. The blade travels axially forward in the handle by a channel cut into one or more of the handles. This interfaces with two parallel round pins in the blade tang. The blade tang moves forward and a third pin rigidly attached to the blade tang interfaces the switch arm and moves it in a parallel direction to the blade. The switch arm and blade are stopped in forward position together by the blade pins. A front lock is held by the switch arm in the closed and deploying positions to allow clearance of the blade. The action of the switch arm moving forward allows the front lock to rotate downwards about a pivot point in its rear from the force of a coil spring and interface slidably with the blade tang to hold the blade in the forward position. As shown in the current embodiment of the knife, the axle is gripped by the user and rotates about its axis to rotate the knife. The axle then slides from its rear position to its forward position, changing the user's default grip position on the handle for use.

The slider actuator is moved towards the back of the handle by the user. The slider actuator moves the internal slider against tension by a spring. A protrusion exists at the front of the slider actuator in the form of a round pin. A lever rotates about a fixed point in the handle and has a top and bottom interface. The lever's bottom interface includes a track to interact with the pin on the internal slider. The lever's top interface contains a rounded surface to slidably interact with the front lock, moving it from its open position to closed. With the front lock moved, the blade is retracted back to its closed position by inertia or gravity. In this action, the blade interfaces the switch arm by its third pin and moves it from its open to closed position. The switch arm contains a surface at the front with an angle and rounded top. This surface moves below the front lock as the switch arm is deployed to the rear by the blade, preventing the front lock from traveling downwards and allowing for clearance on the next deployment. A surface on the blade with an angle or convex curve interfaces with an adjoining angled surface on the rear lock which moves the rear lock up. The blade moves fully back to its rear position and allows the rear lock to move down to allow the blade to be held. The axle is held by the user and used to rotate the knife about a forward position. The axle then moves back to its rear position along its track formed by the handle and a second adjoining bridge with a parallel surface. A detent formed by a cutout in the bridge holds the axle in the rear position.

DETAILED DESCRIPTION OF THE INVENTION

Figure 1:
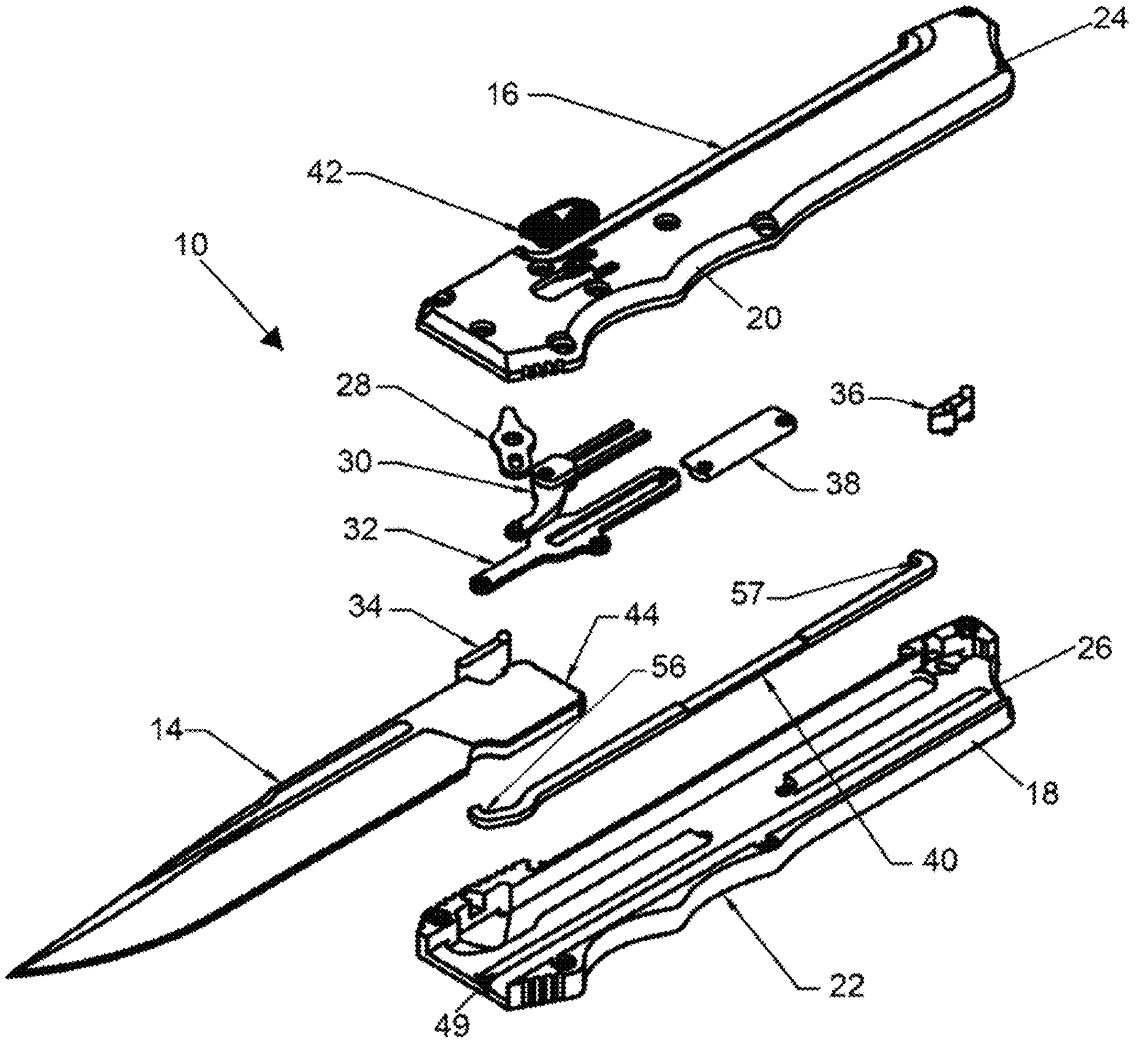
FIG. 1 is a top perspective exploded view of a knife according an embodiment of the disclosure showing the blade in an open position.

In the following description, details are provided using the figures to provide an understanding of embodiments and function of the present invention. The figures contain numbers which refer to physical components or portions thereof, and will be described in detail below. The figures and description do not serve to limit the invention to what is described or illustrated therein and are not intended to limit the scope of what is shown and described.

With reference now to the figures and in particular FIGS. 1-16C embodiments of the knife of the present disclosure, which is generally designated by reference numerals 10, 100 will be described.

Figure 2:
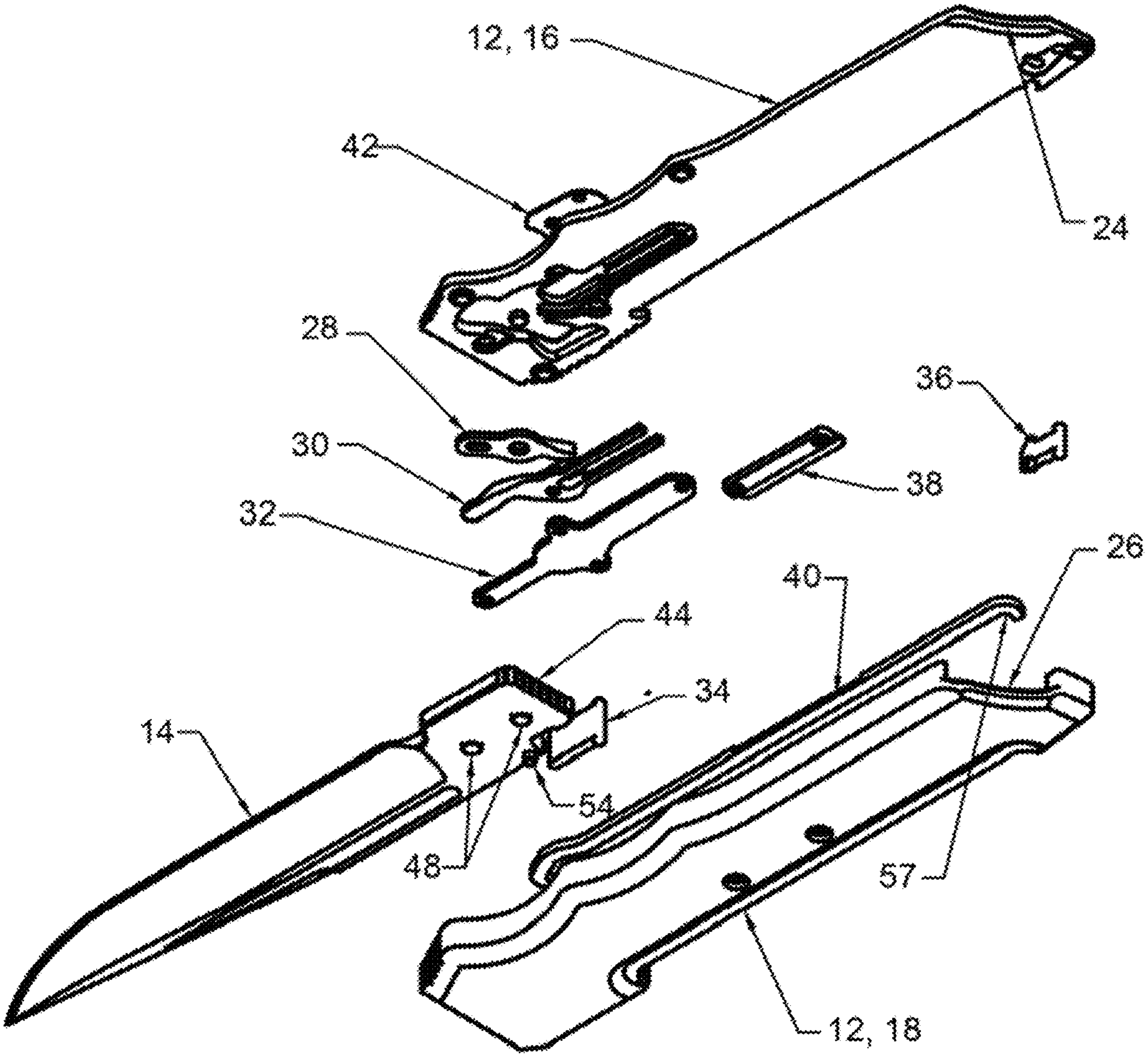
FIG. 2 is a bottom perspective exploded view of the knife with the blade in the open position.

FIGS. 1 and 2 illustrate exploded views of a knife 10 that generally comprises a handle 12 and a blade 14 that is fixed within the handle 12 and moveable between a closed position and open position. The handle 12 is comprised of a first handle portion 16 and a second handle portion 18 that together form a cavity therebetween.

The first handle portion 16 and the second handle portion 18 each include a plurality of recesses 20, 22 respectively, to aid in gripping the knife 10. However, the shape of the handle, grip and related features can take any shape that is known or may be known. The recesses 20, 22 are merely an exemplary handle design. Additionally, unlike a traditional knife handle where the handle would continue to cover the blade 14, the rear of the handle 12 includes recesses 24, 26 that expose the bottom rear corner of the blade tang 44 in the closed position. The blade tang 44 can be textured for grip or be smooth. While the recesses 24, 26 are shown as being curved, they can also take on any other shape or combination of shapes (e.g., linearly extending recess whereby the recesses 24, 26 are formed by straight lines).

In addition to the blade 14, arranged in the cavity between the first handle portion 16 and the second handle portion 18 is a lock lever 28, an internal slider 30, a slider housing plate 32, a front lock 34, a rear lock 36, a switch arm housing plate 38, and a switch arm 40. A slider actuator 42 is arranged in contact with an outer surface of the first handle portion 16.

The first handle portion 16 and the second handle portion 18 of the knife 10 are held together, for example, by a plurality of fasteners (not pictured) which extend in aligned openings that extend through the first handle portion 16 and the second handle portion 18. The fasteners can, for example, be screws, bolts, rivets, etc., or a combination thereof. The means of securing the first handle portion 16 to the second handle portion 18 together should not be limited to fasteners and can alternatively and/or in addition include, for example, a press fit, a snap fit, an adhesive(s), tongue and groove interaction of handle portions 16, 18, etc.

Figure 3A:
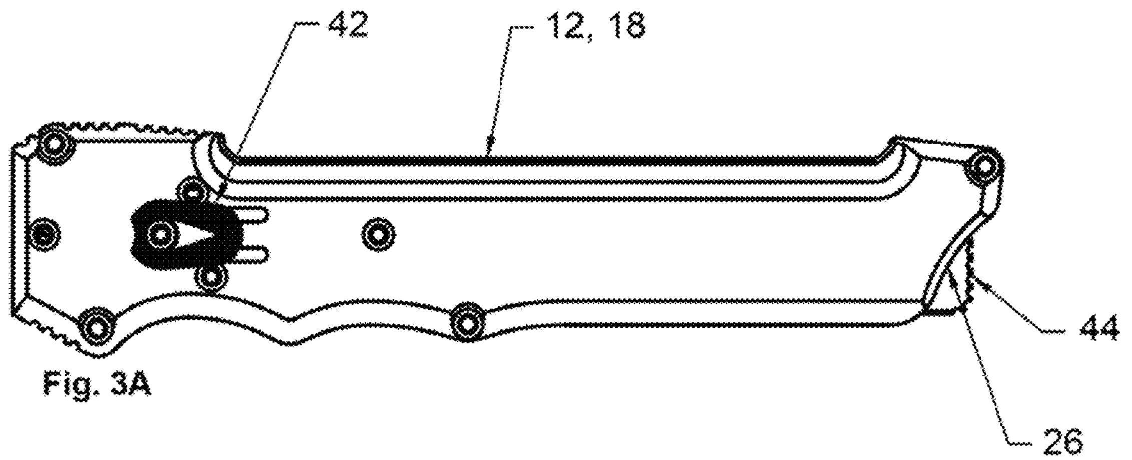
FIG. 3A is a top view of the knife with the blade in a closed position.

FIG. 3A is a top plan view of the knife 10 in the closed position.

Figure 3B:
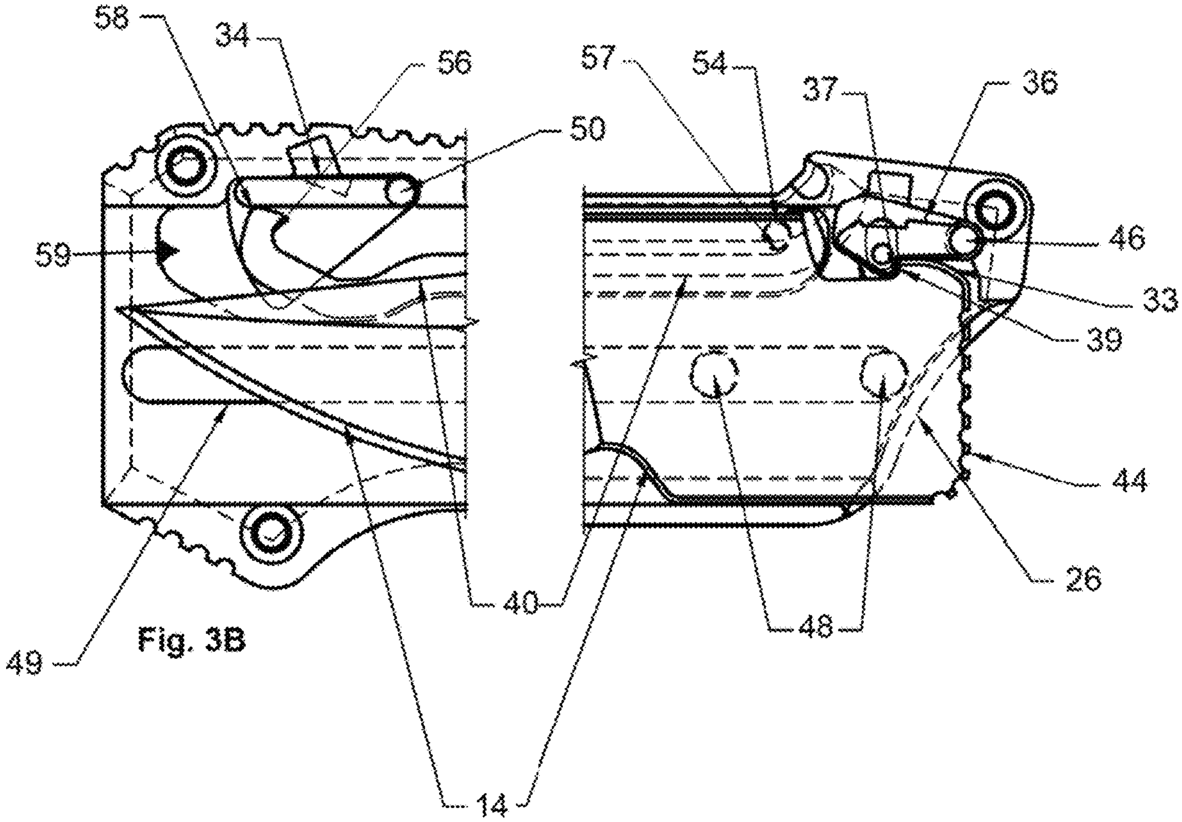
FIG. 3B is a top sectional view of the knife with a top cover removed showing internal components of the knife, and a rear lock engaged with the blade in the closed position, a switch arm in rear position, and a front lock in a retracted position.

FIG. 3B is a detailed view of component of the knife 10 and interactions between the components in the closed position.

The switch arm 40, which includes a curved first end 56 and curved second end 57 (See FIG. 1) is shown in a rearward state with an exterior surface or lock stop interference 58 of the curved first end 56 in contact with the front lock 34, which is rotatable about a pivot 50, to hold the front lock within a cavity 59 of the second handle portion 18. The interaction of the switch arm 52 with the front lock 34 in both the closed position and an open position (See FIG. 4B) prevents friction on the blade 14 during travel in both a forward and rearward direction, and enables the blade 14 to have a second edge at a top of the blade without additional wear on the blade 14 or second edge from contact with the front lock 34. The blade 14 includes a projection or pin 54 that interfaces with the switch arm 40 to aid the switch arm 40 in moving between a forward and rearward state. As shown in FIG. 3B, the pin 54 of the blade 14 is in contact with the curved second end 57 of the switch arm 34 to ensure the switch arm 34 is in a fully retracted position.

The blade 14, is stabilized by two fasteners or pins 48 fixed to the blade 14 that slide within a track 49 of the second handle portion 18 as the blade 14 travels forward and rearward within the housing 12. The rear lock 36, which is rotatable about a pivot 46, includes a protrusion or hook 37 that interacts with a protrusion or hook 39 that extends from the blade tang 44 to prohibit the blade 12 from traveling freely. In a closed state, the rear lock 36 is held in contact with the protrusion or hook 39 that extends from the blade tang 44 by pressure applied from a spring (not shown) that is in contact with the rear lock 36.

Figure 4A:
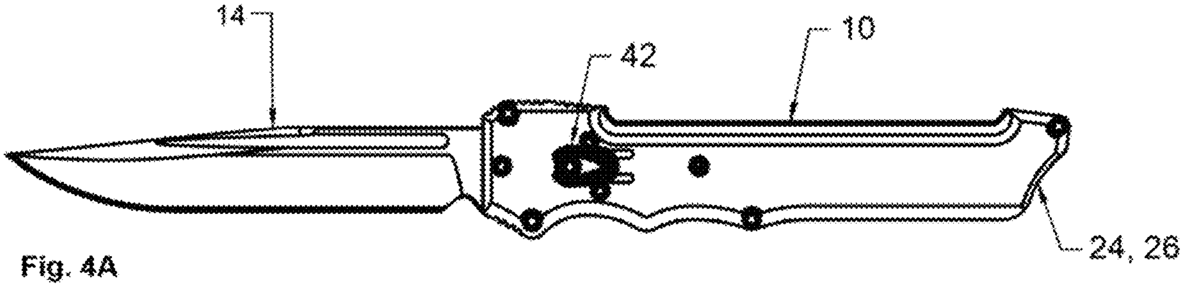
FIG. 4A is a top view of the knife with the blade in the open position.

FIG. 4A shows the blade 14 of the knife 10 in the open position.

Figure 4B:
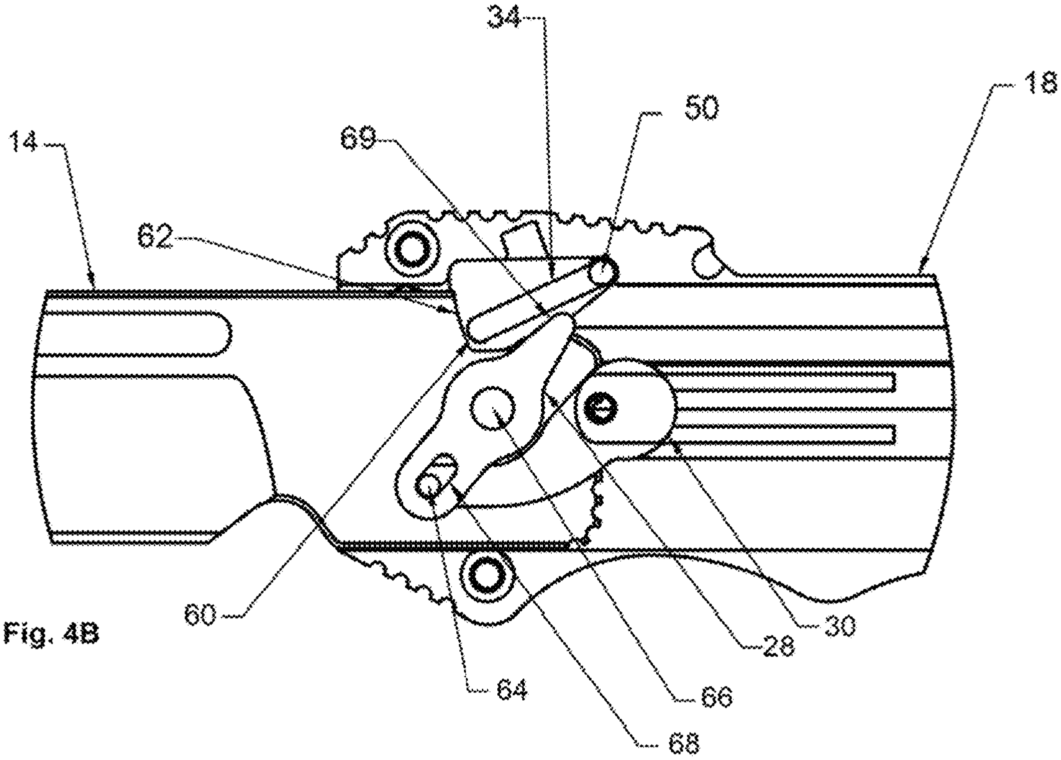
FIG. 4B is a sectional view of the front of the knife with the top handle removed with a front lock in a deployed position and a switch arm in a forward position.

FIG. 4B is a detail view of the front of the knife 10 in the open position with the first handle 16 and the slider housing plate 32 removed.

The slider actuator 42 and internal slider 30 are connected rigidly with a screw (not shown). The internal slider 30 is tensioned by a spring (not shown) that runs longitudinally to the axis of the knife 10 to hold the internal slider 30 in a forward position. The slider 30 moves forward and backwards axially in a track 21. The slider 30 interfaces with the lock lever 28 by a fixed projection or round pin 64 extending from the slider 30. The lock lever 28 moves radially around a pin 66 extending from the second handle 18. The pin 64 fixed to the slider 30 moves in a slot 68 in the lock lever 28 which is perpendicular to its length. The slot 68 is used to compensate for the change in radius as the lock lever 28 rotates to convert linear motion of the slider 30 into rotational motion in the lock lever 28. The opposite end of the lock lever 28 to the slot that interfaces with the slider 30 has a rounded point]69 which interfaces with the front lock 34.

Viewing the components of the knife 10 in the closed shown in FIG. 3B and the components of the knife 10 in the open position as shown in FIG. 4A, when a force is applied to the blade 14 via the blade tang 44, the force is transferred and in turn is applied on the projection or hook 37 of the rear lock 36 via the protrusion or hook 39 of blade tang 44. When the rear lock 36 is overcome by enough force, the spring and the rear lock 36 rotate about the pivot 46 of the rear lock 36, releasing the blade 14 and allowing the blade 14 to travel in a forward direction. The force causes the pin 54, which is fixed to the blade tang 44, to apply force on the switch arm 40, which moves the switch arm 40 and the blade 14 forward, parallel to the switch arm 40 and pin 54 toward the front of the knife 10. In the forward position, the pin 54 interfaces with the first end 56 of the switch arm 40 to move the first end 56 of the switch arm 40 beyond the front of the lock 54, such that the front lock 34 is disengaged from contact with the switch arm 40, allowing the front lock 34 to rotate downward and interface with the blade 14 between a front 60 of the front lock 34 and a matching cutout 62 in the blade tang 44 to prevent the blade 10 from retracting (see FIG. 4B). The protrusion or the hook 39 is in slidable contact with a rounded surface 33 on the blade tang 44 until the blade 14 in a fully extended state whereby the rear lock 36 rotates downward and a distal end of the rear lock 36 contacts the blade tang 44 to aid in securing the blade tang 44in the open position (see FIG. 7A).

To retract the blade 14, a force is applied to the slider actuator 42, which causes the slider 30 to move axially toward the rear of the knife 10 and in turn causes the lock lever 28 to rotate causing the round point 70 of the lock lever 28 to apply a force on the front lock 34 to release the contact between the front 60 of the front lock lever 34 and the cutout 62 in the blade tang 44. When the front lock 34 is moved to a retracted position by the lock lever 28, the blade 14 is allowed to move backwards into the handle 12 by gravity or inertia. As shown in FIG. 3B, the blade pin 54 that interfaces the switch arm 40 contacts the switch arm 40 at the rounded interface 57 of the switch arm 40 before moving the switch arm 40 to a fully closed position. This allows the front lock 34 to be set in place again and the slider 30 to be released.

Figure 5:
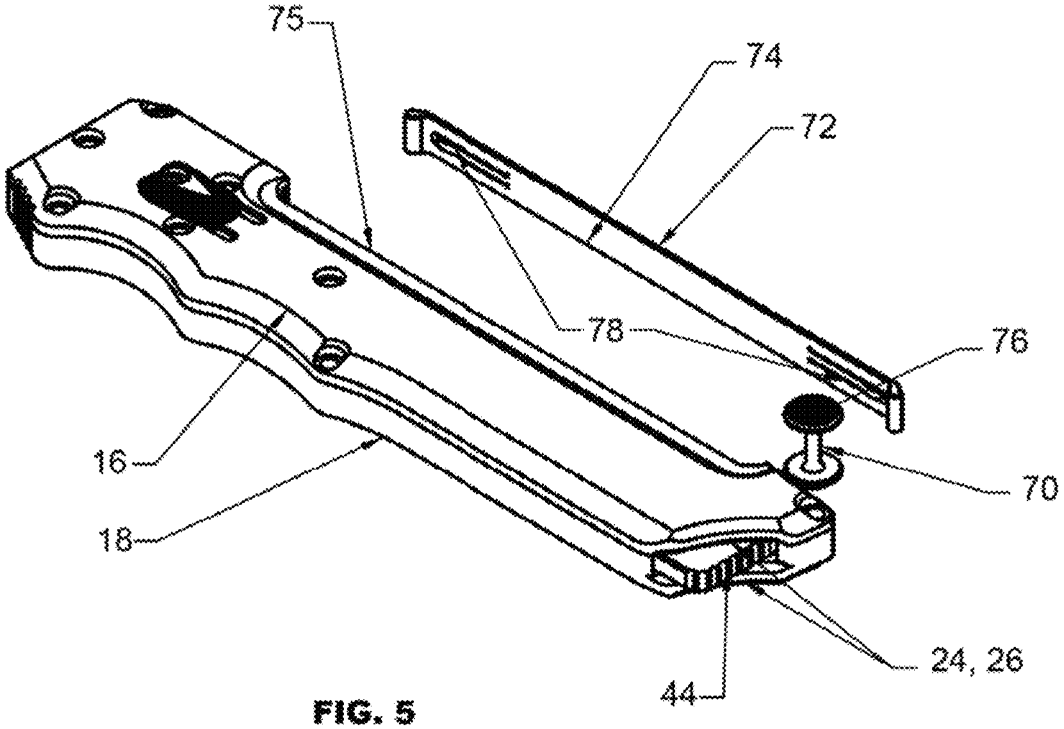
FIG. 5 is a partially exploded perspective view of the knife showing an axle and bridge assembly spaced from the knife body.

FIG. 5 shows a perspective view of an embodiment of the knife 10 in a closed position that includes an axle 70 and a bridge 72 that are spaced away from the rest of the components that comprise the knife 10. The axle 70 and the bridge 72 are not integral to the mechanics of the other mechanisms of the knife 10.

Figures 6A, 6B:
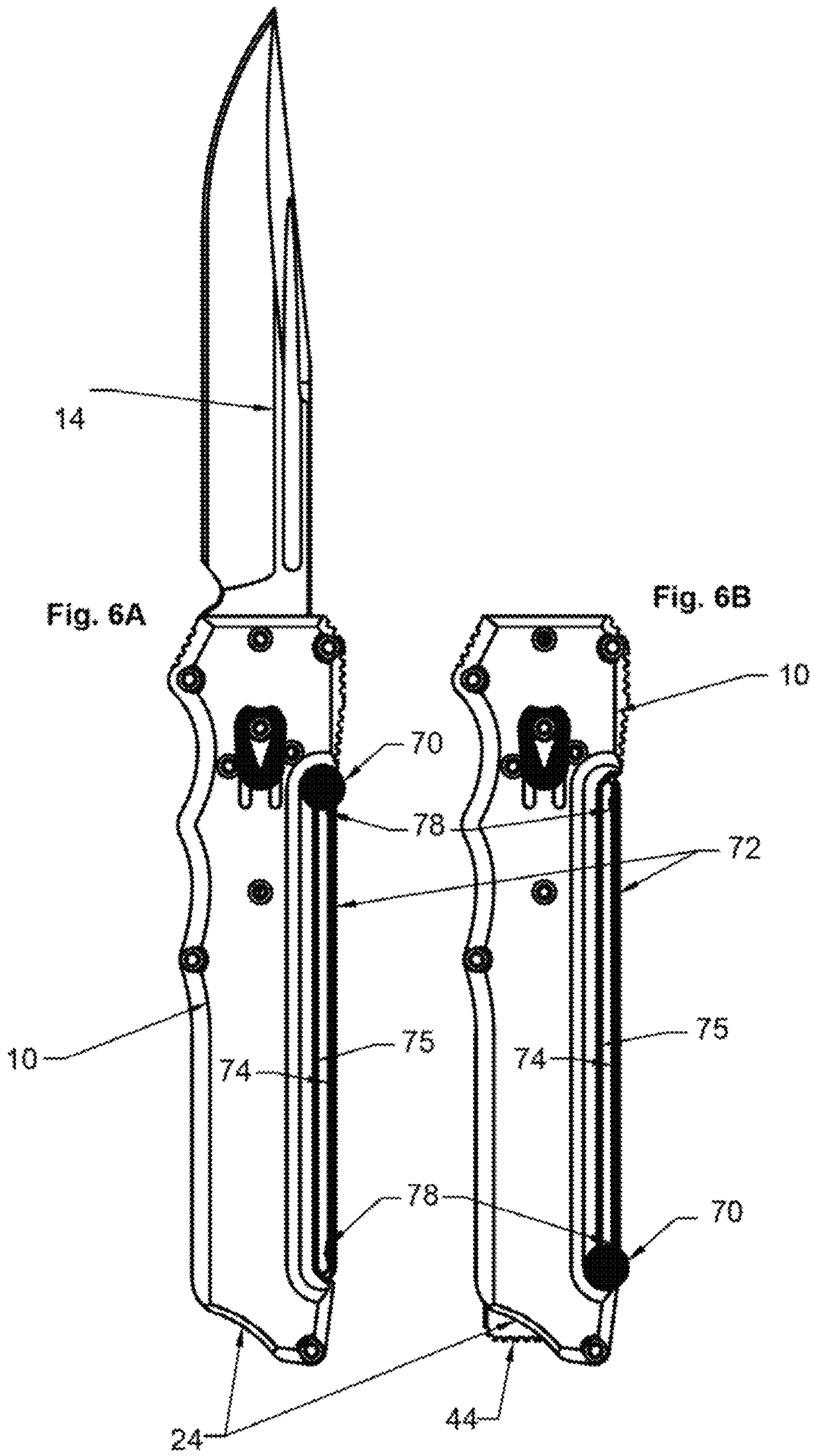
FIG. 6A is atop view of the knife in an open position with the blade and axle in the forward position.
FIG. 6B is a top view of the knife in a closed position with the blade and the axle in each in a rear position.

FIG. 6A shows the blade 14 and the axle 70 of the knife 10 in a front position and FIG. 6B show the blade 14 and the axle 70 of the knife in a rear position. The bridge 72 is mounted to the handle 12 through interlocking tabs. However, the bridge 72 can be attached to the handle 12 through other methods that may be known or become known. The bridge 72 has a lower surface 74 which is straight and flat and combines with a parallel surface on the handle surface 75 to form a channel therebetween. The axle 70 includes of a round pin with a central dimeter that is narrower than outer diameters thereof. The outer diameters of the axle 70 form an outer surface 76 (see FIG. 5) which is textured to aid in gripping the axle 70. The axle 70 slides on the flat surfaces of the bridge 74 and the handle 75 and moves in the channel created. The bridge 72 has detents 78 which loosely keep the axle 70 in place at each end and are created by cutouts in the bridge 72. The axle 70 and bridge 72 serve to assist the user in changing their grip on the knife 10 by a combination of rotating and sliding the knife 10 to aid in deploying and/or retracting the blade 14.

Figure 7A:
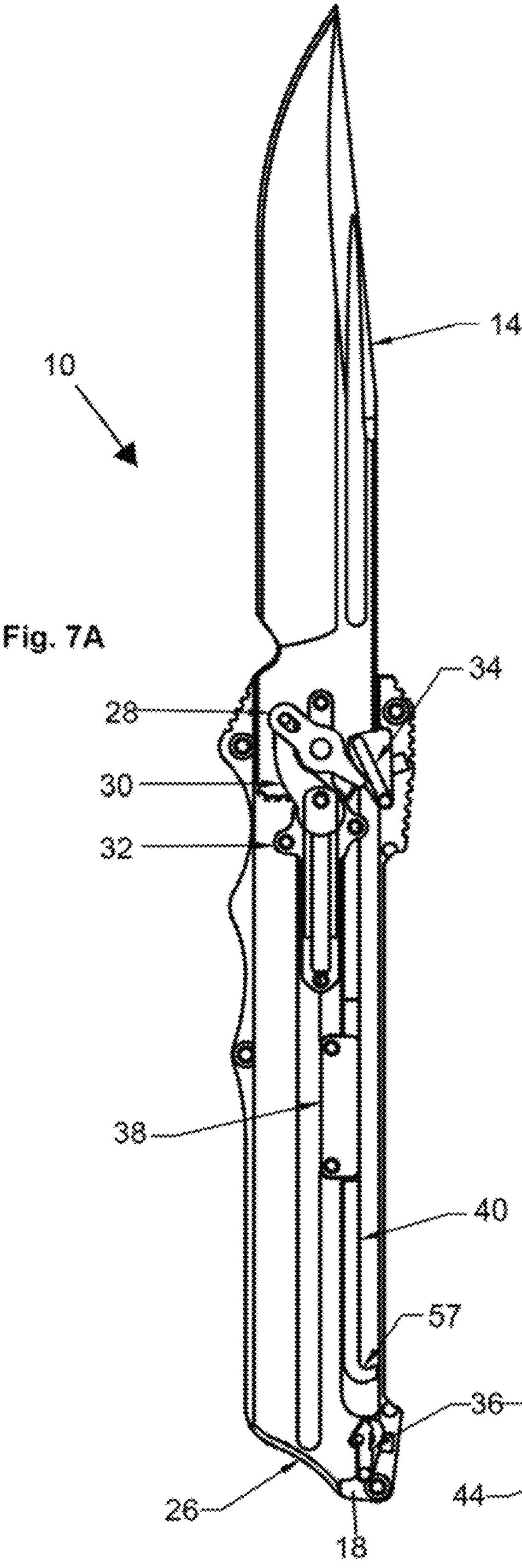
FIG. 7A is atop view of the knife in an extended state with a portion of the handle removed.
Figure 7B:
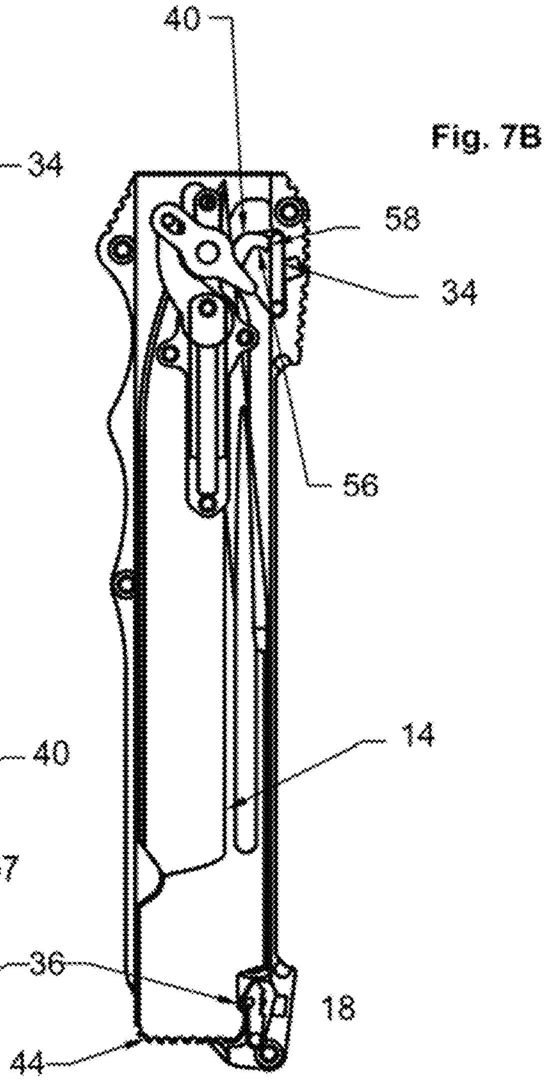
FIG. 7B is atop view of the knife in a retracted state with a portion of the handle removed.

FIG. 7A illustrates the knife 10 with the first housing 14 removed in an extended state and FIG. 7B illustrates the knife 10 with the first housing 14 removed in a retracted state.

Figure 8A:
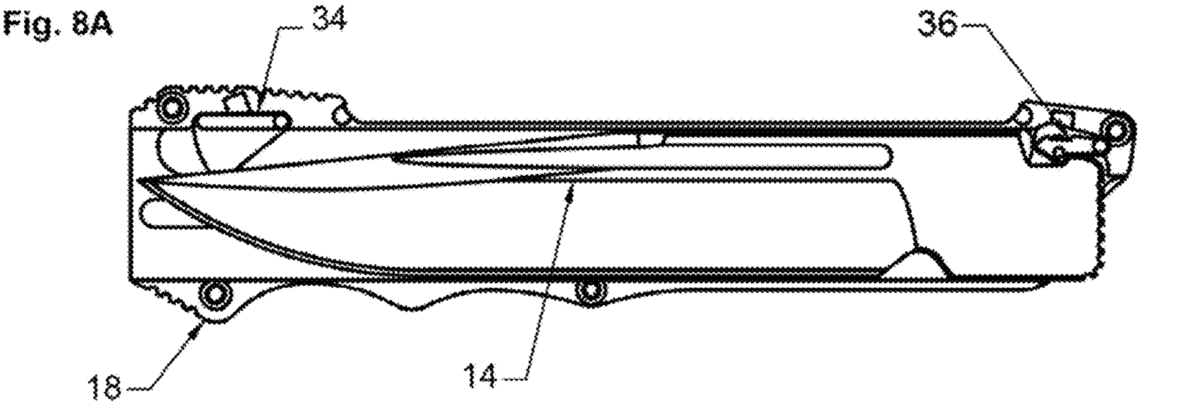
FIG. 8A is atop view of the knife in a retracted state with a portion of the handle removed.
Figure 8B:
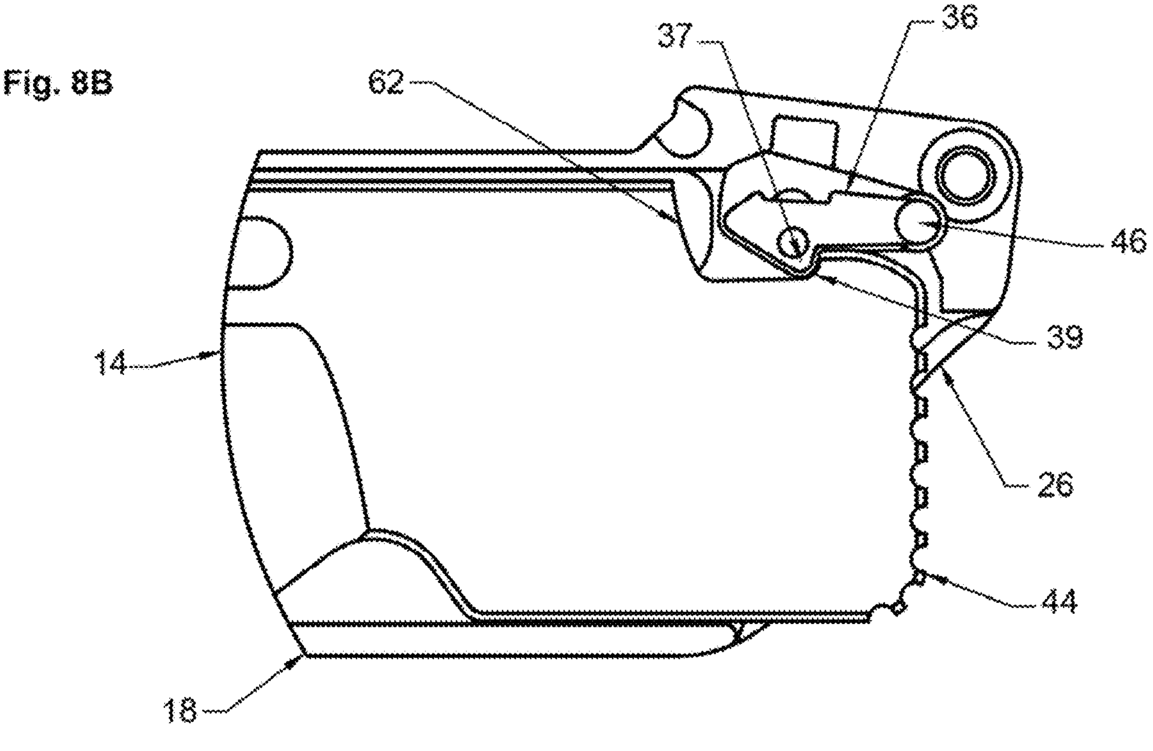
FIG. 8B is a section view from FIG. 8A of a rear portion of the knife in a retracted state with a portion of the handle removed.

FIG. 8A is a complete side view of the knife 10 in a closed position and FIG. 8B is a detail view of the rear of the knife 10 in the closed position.

FIGS. 9-16C illustrate various views of another embodiment of a knife 100.

Figure 9:
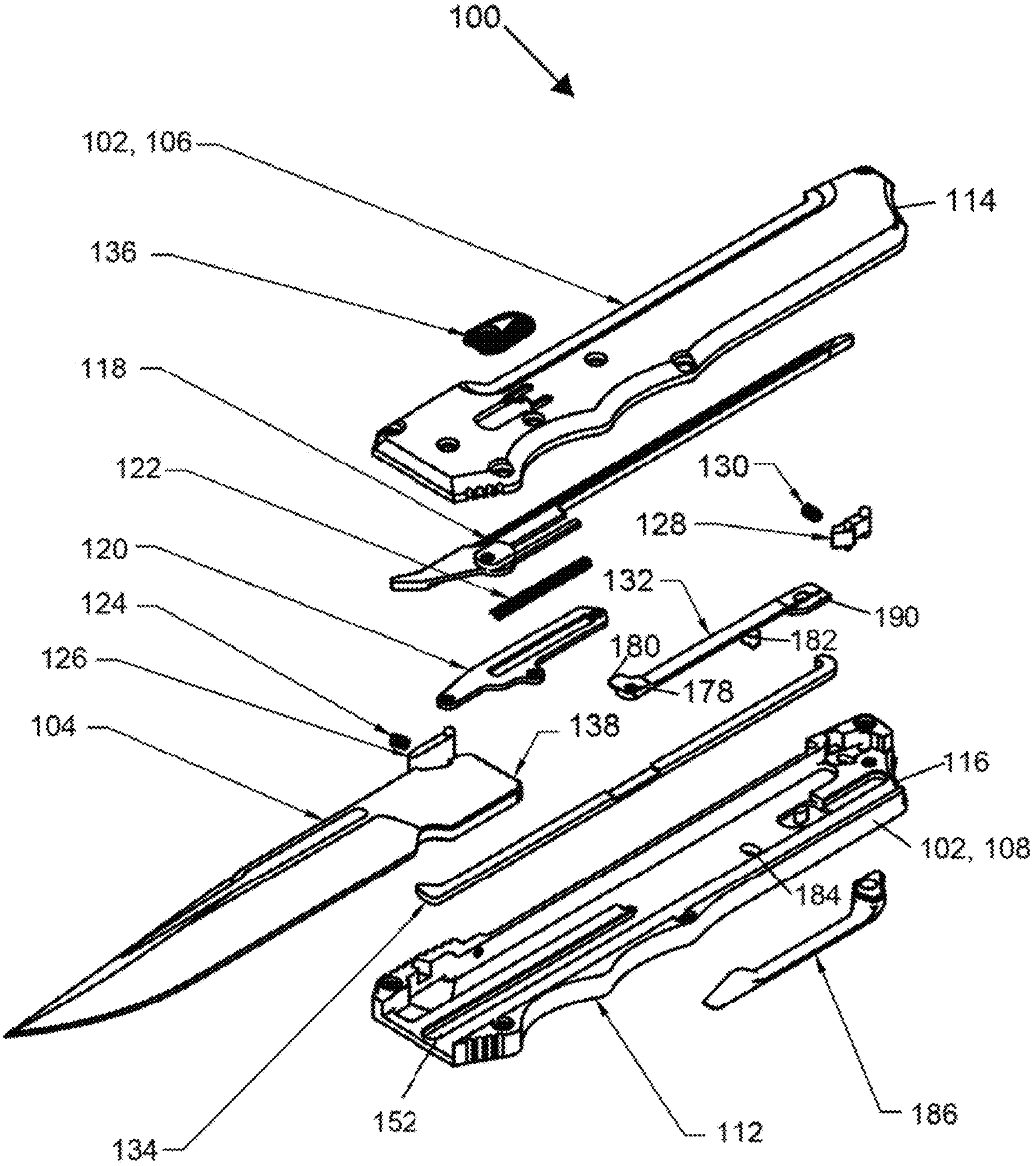
FIG. 9 is a first perspective exploded view of a knife according another embodiment of the disclosure showing the blade in an open position.
Figure 10:
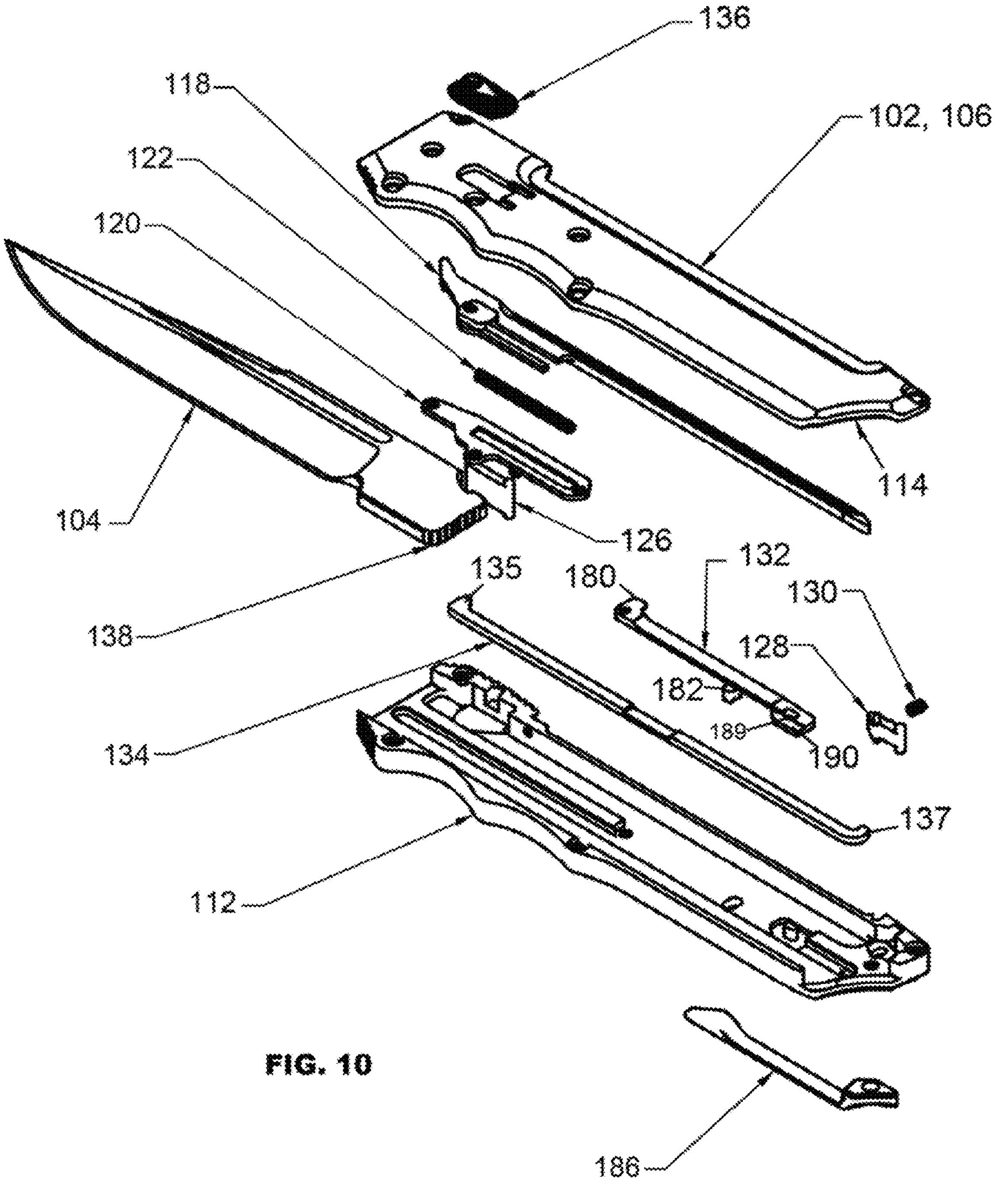
FIG. 10 is a second perspective exploded view of the knife of FIG. 9 with the blade in the open position.

FIGS. 9 and 10 illustrate exploded views of the knife 100. The knife 100 generally comprises a handle 102 and a blade 104 that is fixed within the handle 102 and slidably moveable between a closed position and open position. The handle 102 includes a first handle portion 106 and a second handle portion 108 that together form a cavity therebetween.

The first handle portion 106 and the second handle portion 108 each include a plurality of recesses 112, respectively, to aid in gripping the knife 100. However, the shape of the handle, grip and related features can take any shape that is known or may be known. The recesses 112 are merely an exemplary handle design. Additionally, unlike a traditional knife where the handle would continue to cover an entire blade 104, the rear of the handle 102 includes recesses 114, 116, respectively, that expose the bottom rear corner of the blade tang 138 in a closed position. The blade tang 138 can be smooth or textured for grip. While the recesses 114, 116 are shown as being curved, the recesses 114, 116 can take on any other shape or combination of shapes (e.g., linearly extending recess whereby the recesses 114, 116 are formed by straight lines).

In addition to the blade 104, arranged in the cavity between the first handle portion 106 and the second handle portion 108 is an internal slider 118, a slider plate 120, a slider return spring 122, a front lock spring 124, a front lock 126, a rear lock 128, a rear lock spring 130, a safety 132, and a switch arm 134. A slide actuator 136 is arranged in contact with an outer surface of the first handle portion 106.

The first handle portion 106 and the second handle portion 108 of the knife 100 are held together, for example, by a plurality of fasteners (not pictured) which extend in aligned openings in the first handle portion 106 and the second handle portion 108. The fasteners can, for example, be screws, bolts, rivets, etc., or a combination thereof. However, the first handle portion 106 and the second handle 108 should not be limited to being secured to each other by fasteners and can alternatively and/or in addition include, for example, a press fit, a snap fit, an adhesive(s), tongue and groove interaction of handle portions 106, 108, etc.

Figure 11A:
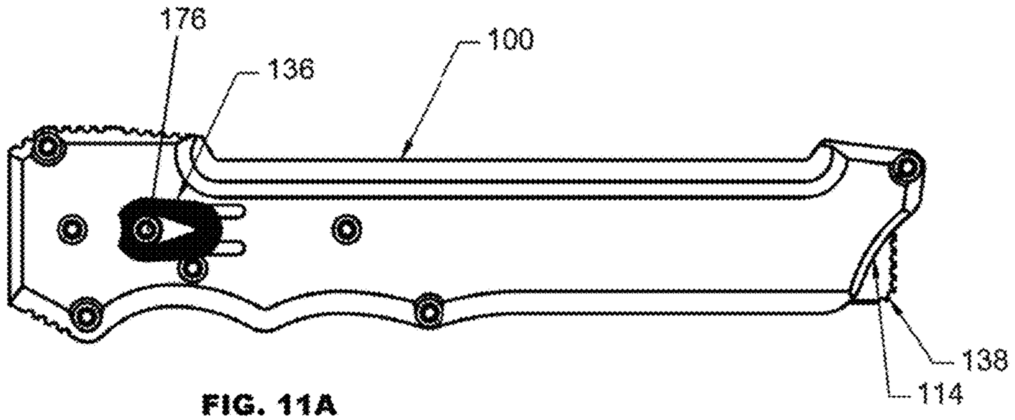
FIG. 11A is a front view of the knife of FIG. 9 with the blade in a closed position.

FIG. 11A is a top plan view of the knife 100 in the closed position.

Figure 11B:
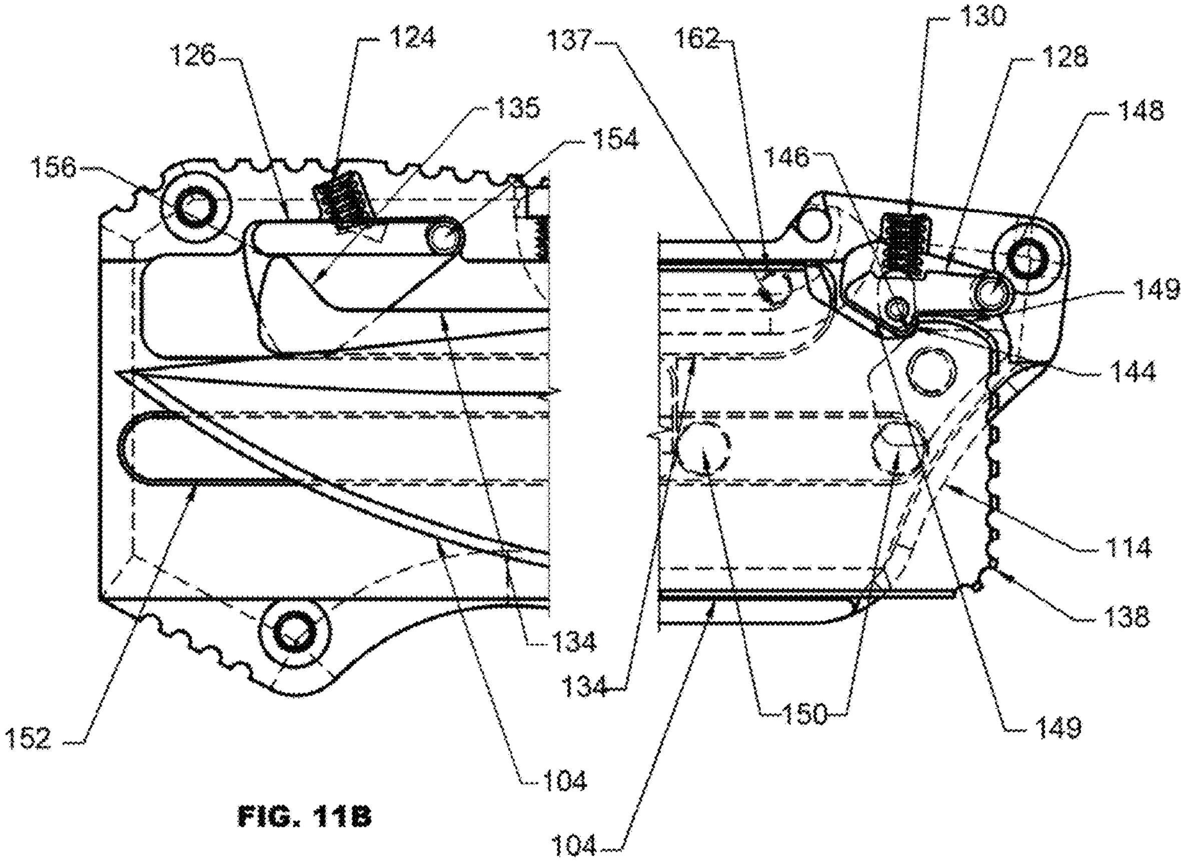
FIG. 11B is a front sectional view of the knife of FIG. 9 with atop cover removed showing internal components of the knife, and a rear lock engaged with the blade in the closed position, a switch arm in rear position, and a front lock in a retracted position.

FIG. 11B is a detailed view of interactions of components of the knife 100 in the closed position.

The switch arm 134, which includes a curved first end 135 and curved second end 137 (see FIG. 9), is shown in a rearward state. An exterior surface or lock stop interference 156 of the curved first end 135 is in contact with the front lock 126, which is rotatable about a pivot 154, to compress the spring 124 and hold the front lock within a cavity 158 of the second handle portion 108. The interaction of the switch arm 134 with the front lock 126 in both the closed position and an open position (See FIG. 11B, 12B) prevents friction on the blade 104 during travel in both a forward and rearward direction, and enables the blade 104 to have a second edge at a top of the blade without additional wear on the blade 104 or second edge from contact with the front lock 126. The blade 104 includes a projection or pin 162 that interfaces with the switch arm 134 to aid the switch arm 134 in moving between a forward and rearward state. As shown in FIG. 11*n*, the pin 162 of the blade 104 is in contact with the curved second end 137 of the switch arm 134 to ensure the switch arm 134 is in a fully retracted position. Before the knife 100 is in a fully closed state as shown in FIG. 11B, the blade pin 162 will contact the switch arm 134 at the rounded interface 137 of the switch arm 134.

The blade 104, is stabilized by two fasteners or pins 150 fixed to the blade 104 that slide within a track 152 of the second handle portion 108 as the blade 104 travels forward and rearward within the housing 102. The slider actuator 136 and the internal slider 118 are connected rigidly with a fastener 176 such as a screw, rivet or the like. The internal slider 118 is tensioned by the spring 122 that runs longitudinally to the axis of the knife 100 to hold the internal slider 118 in a forward position. The slider 118 moves forward and backwards axially in the track 154. The rear lock 128, which is rotatable about a pivot 148, includes an inclined surface 149 and a protrusion or hook 146 that interacts with a protrusion or hook 144 that extends from the blade tang 138 to prohibit the blade 102 from traveling freely.

Figure 12A:
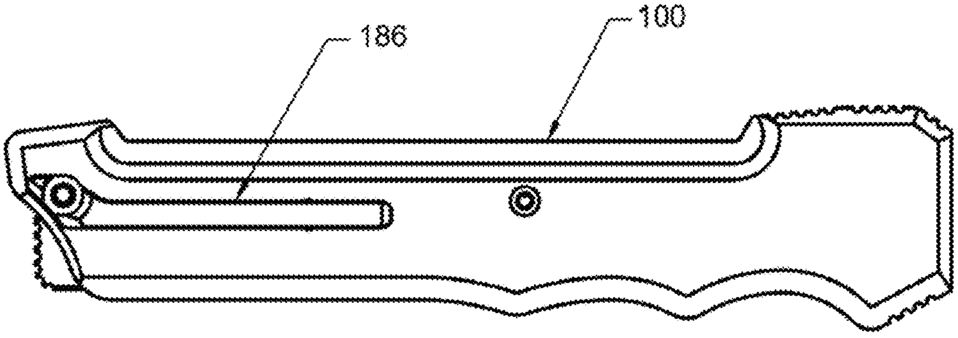
FIG. 12A is a rear view of the knife of FIG. 9 with the blade in the closed position.

FIG. 12A shows a rear side view of the knife 100 in a closed position.

Figure 12B:
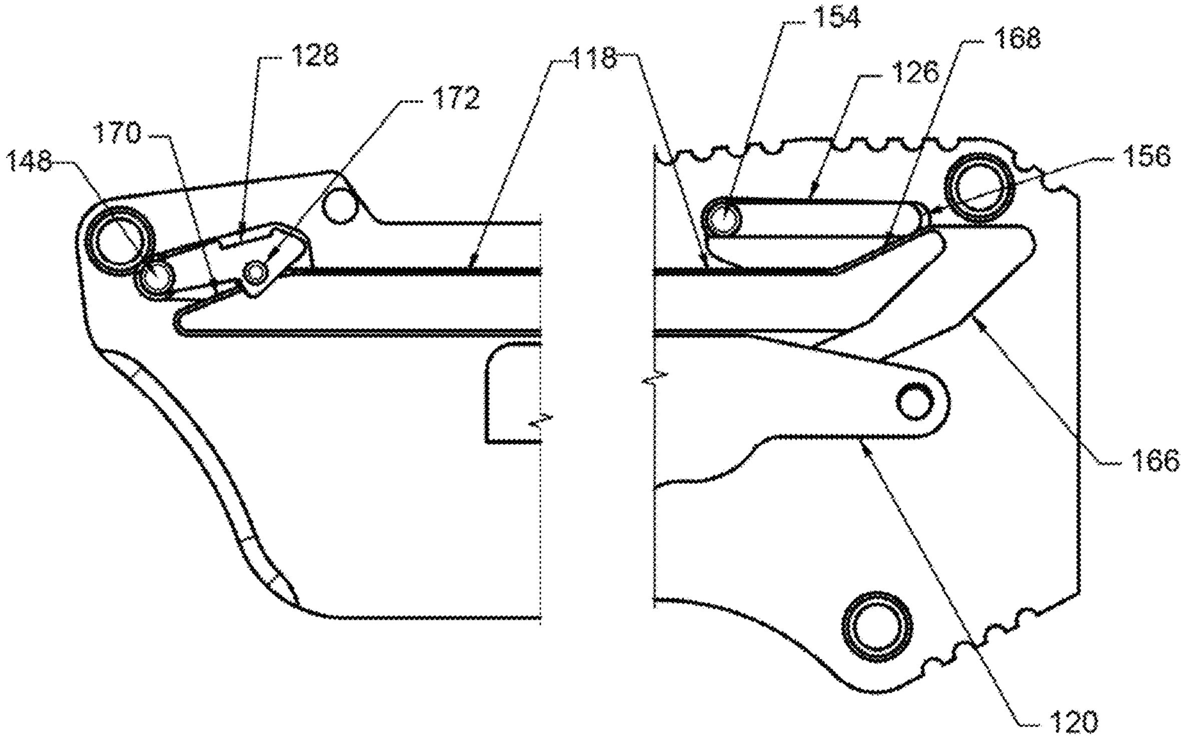
FIG. 12B is a sectional view of the front of the knife of FIG. 9 with the second handle removed showing internal components of the knife.

FIG. 12B is a sectional rearview of the knife 100. As shown, the internal slider 118, which is arranged in a cavity 166 and slidable within the cavity 166, is contactable at a first end with a front inclined surface 168 with the front lock interface 156 and contactable at a second end at an incline 170 with the rear lock interface 172. The internal slider 118 is fixed to the external slider 136 by a fastener (e.g., screw). With the knife 100 in an open position, a rearward force can be imparted on the external slider 136, which therefore moves the internal slider 118 rearwards within the cavity 166. Simultaneously, the front and rear inclined surfaces 168, 170 of the slider 118 interact with the rounded interfaces 156, 172 on the front lock 126 and the rear lock 128 and the rear lock 128 and move the front lock 126 upwards out of the path of the blade 104. The slider plate 120 is fixed in place above the internal slider 118 to hold it in its cavity 166.

Figure 13A:
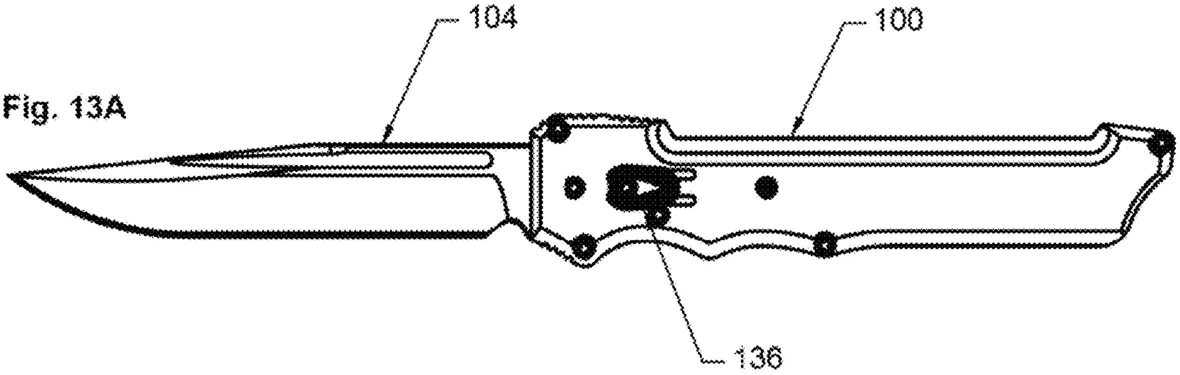
FIG. 13A is a front view of the knife of FIG. 9 in an open position with the blade in the forward position.

FIG. 13A is a side view showing the knife 100 in an open position with the blade 104 extended from the front of the knife 100.

Figure 13B:
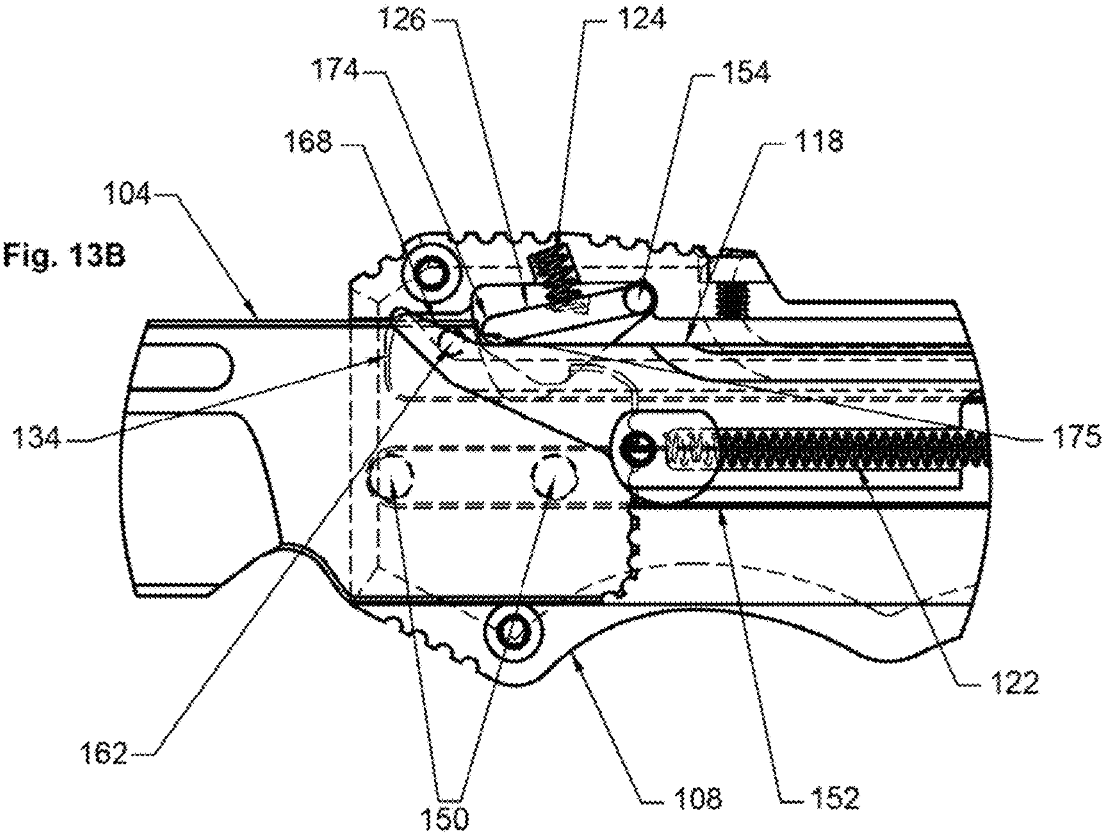
FIG. 13B is a sectional view of the knife in the open position showing internal components of the knife.

FIG. 13B is a detail view of the front of the knife 100 with the first housing 106 removed.

Movement between a closed state and an open state can be seen viewing FIG. 11B and FIG. 13B. In a closed state, the rear lock 128 is held in contact with the protrusion or hook 144 that extends from the blade tang 144 by a force applied from a spring 130 arranged in a recess 131 of the second handle portion 108. When a force is applied to the blade 104, the force is in turn exerted on the rear lock 128 through a hook 144 on the blade tang or blade deployment area 138 to a stepped portion 146 of the rear lock 128. In the closed state, the rear lock 128 is moveable radially around the pivot 148 upon being overcome by enough force at the blade tang 138 to compress the spring 130 and rotate the rear lock 128 upwards, releasing the blade 104 and allowing the blade 104 to move axially toward the front of the housing 102 with the rear lock 128 contacting the rear blade incline 149 as the blade 104 passes beyond the rear lock 128.

As the blade 104 and in turn the switch arm 134 move linearly toward the front of the knife 100 and the switch arm 134 contacts the front lock 126 at the front lock interface 156 and the front lock 126 moves radially about a pivot 154 toward a retracted position within a groove 158 of the handle 102. The pin 162 that interfaces with the first end 135 of the switch arm 134, moves the first end 135 of the switch arm 134 beyond the front of the front lock 126, such that the front lock 126 is disengaged from contact with the switch arm 134, allowing the front lock 126 to rotate downward due to a force applied by the spring 124 and interface with the blade 104 between a front 174 of the front lock 126 and a matching cutout 175 in the blade tang 138 to prevent the blade 100 from retracting (see FIG. 11B). The protrusion or the hook 146 is in slidable contact with a rounded surface 149 on the blade tang 138 until the blade 104 in a fully extended state whereby the rear lock 128 rotates downward and a distal end of the rear lock 128 contacts the blade tang 138 to aid in securing the blade tang 138 in the open position (see FIG. 14A).

Figures 14A, 14B:
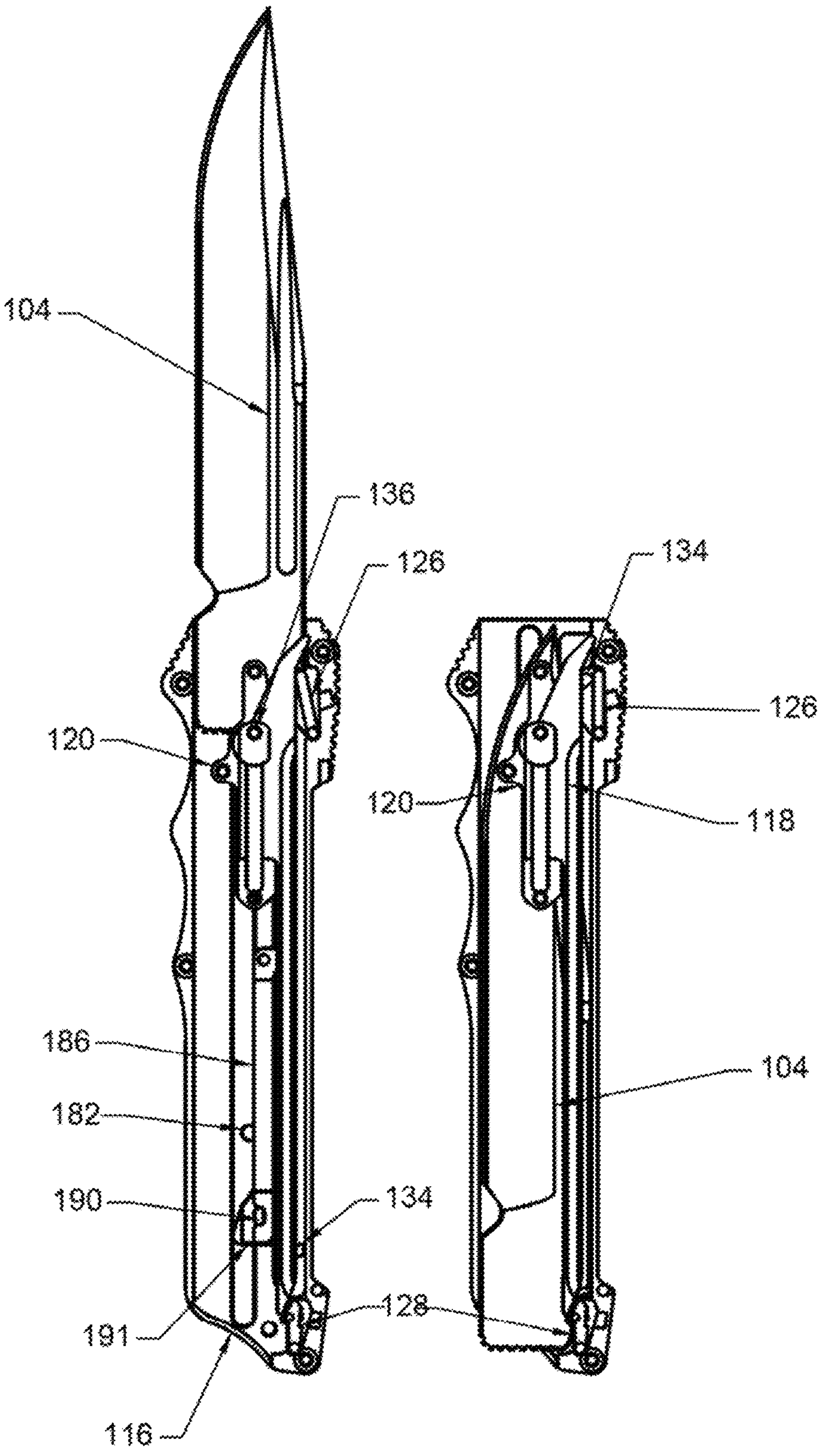
FIG. 14A is a front view of the knife of FIG. 9 in an extended state with a portion of the handle removed.
FIG. 14B is a top view of the knife of FIG. 9 in a retracted state with a portion of the handle removed.
Figures 15A, 15B:
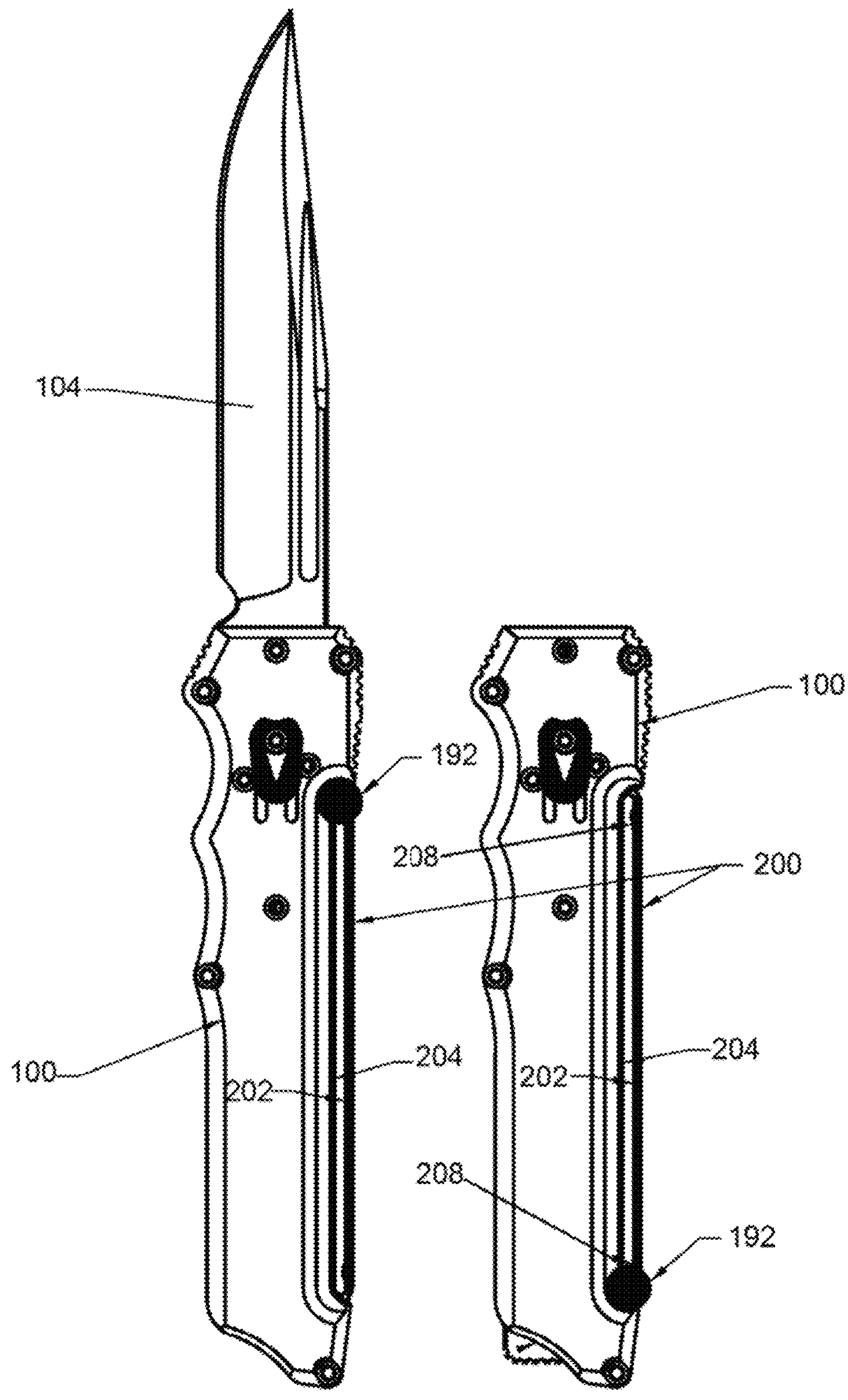
FIG. 15A is a front view of the knife of FIG. 9 in an extended state.
FIG. 15B is a front view of the knife of FIG. 9 in a retracted state.

FIGS. 14A and 15A show the knife 100 in an extended position with FIG. 14A showing the knife in the extended position with the first handle portion 106 removed.

As can be seen in the figures, the safety 132, which is one piece, includes a first hole 178 for fastening the safety at one end to the handle 102, a first protrusion 180, which is flexible, extending in a first direction from the safety 132 at or near the first end of the safety 132, a second protrusion 182 extending from the safety 132, through an opening 184 in the handle 102 and beyond the external surface of the handle 102 in a non-contact state, a second hole 189 extending through the safety 132 near a second end of the safety 132 and a third protrusion 190, which is flexible, extending from the safety 132 in the second direction, at or near the second end of the safety 132. The first protrusion 180 aids to secure the switch arm 134 within the handle 102. The third protrusion 190 is stepped so as to match the blade pin track 152 and permit the blade pins 150 to slide over the flexible protrusion 190.

FIGS. 14B and 15B illustrates the knife 100 in the closed position with the first handle portion 106 removed in the closed position.

FIG. 15A shows the blade 104 and the axle 192 of the knife 100 in a forward position and FIG. 15B show the blade 104 and the axle 192 of the knife 100 in a rearward position. The bridge 200 is mounted to the handle 102 through interlocking tabs. However, the bridge 200 can be attached to the handle 102 through other methods that may be known or become known. The bridge 200 has a lower surface 202 which is straight and flat and combines with a parallel surface on the handle surface to form a channel therebetween. The axle 192 includes of a round pin with a central dimeter that is narrower than outer diameters thereof. The outer diameters of the axle 192 form an outer surface which can be textured to aid in gripping the axle 192. The axle 192 slides on the flat surfaces of the bridge 200 and the handle 204 and moves in the channel created. The bridge 200 has detents 208 which loosely keep the axle 192 in place at each end and are created by cutouts in the bridge 200. The axle 192 and bridge 200 serve to assist the user in changing their grip on the knife 100 by a combination of rotating and sliding the knife 100 to aid in deploying and/or retracting the blade 104.

Figure 16A:
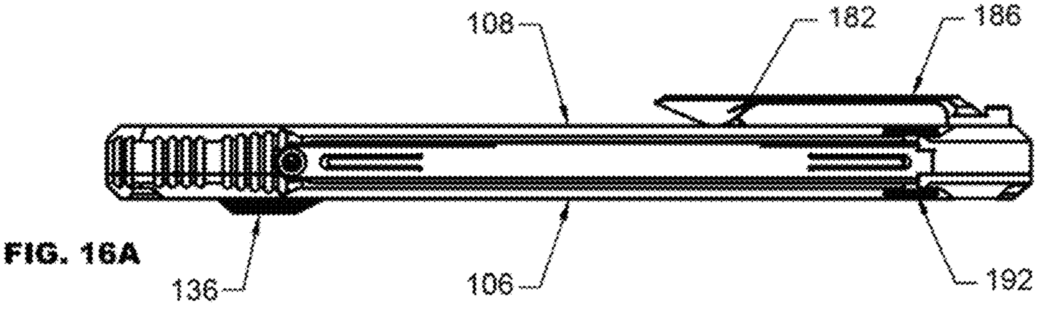
FIG. 16A is a top view of the knife of FIG. 9 in a retracted state.
Figure 16B:
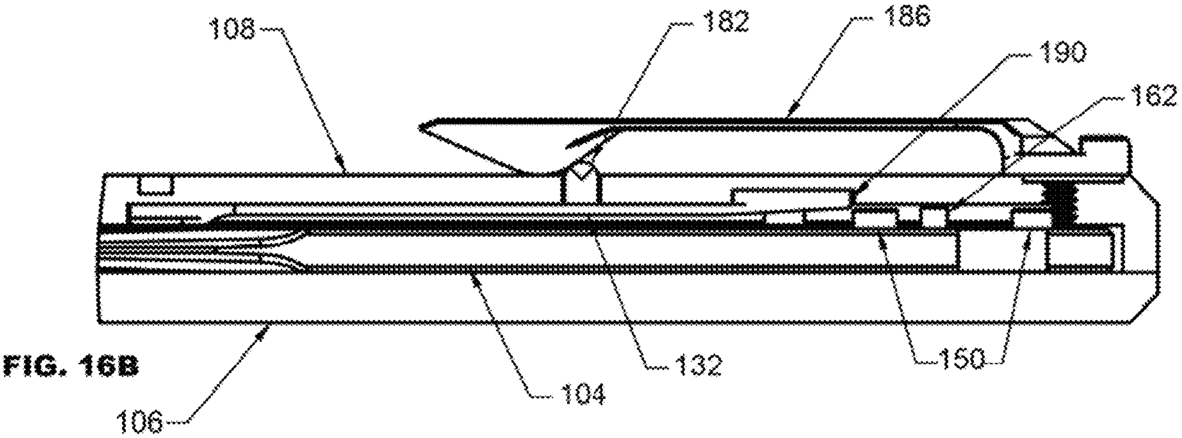
FIG. 16B is a top sectional view of the knife of FIG. 9.
Figure 16C:
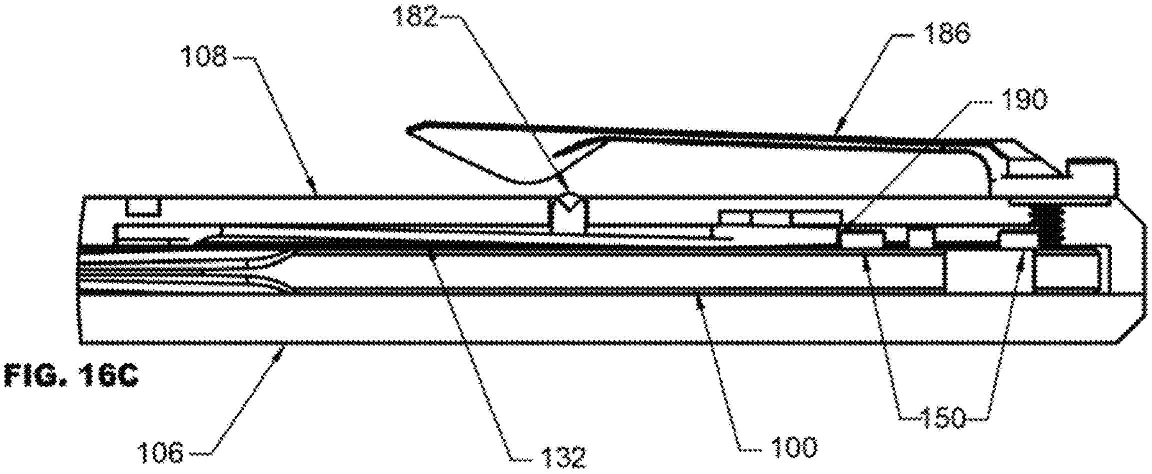
FIG. 16C is a top sectional view of the knife of FIG. 9.

FIG. 16A is a top view of the knife 100. FIG. 16B is a detail of the top view of the knife 100 with the second protrusion 182 of the safety 132 projecting through the handle 102. FIG. 16C shows the pocket clip 186 spaced from second protrusion 182 and the second protrusion 182 depressed within the handle 102 causing the safety 132 to flex and prohibit movement of the blade pins 150 and in turn the blade 104. The second protrusion or tab 182 that goes through the handle 102 is not directly underneath where the clip 186 contacts the handle 102, but rather slightly behind the point of contact between the clip 186 and the handle 102. This is so that pressure on the clip 186 does not in turn cause a flexible force to be applied on the safety 132.

When the second protrusion 182 is in a relaxed state (i.e., no force is applied thereto), the safety 132, which is flexible, not in a flexed state, as shown in FIG. 16B, the blade pins 150 can pass over the safety 132 and in turn the blade 104 can be deployed. When the second protrusion 182 becomes depressed within the handle 102 (see FIG. 16C) such as, for example, by fabric from clothing when the knife 100 is arranged in a pocket and the clip 186 is used to secure the knife within the pocket with the fabric sliding between the clip 186 and handle 102, the safety 132 is flexed. When the safety 132 is flexed, the entire length of the safety 132 acts as a leaf spring and pushes the far end down, which when the blade 104 is in the closed position within the handle 104, matches the end of the safety 132 with the forward blade pin 150, creating an interference 191 so that even if pressure is put on the blade tang 138 and the rear lock 128 is overcome, the safety 132 will be in the way of deployment of the blade 104 toward the open state.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. It is to be understood that the phraseology or terminology employed herein is for the purpose of description and not of limitation. In addition, while several variations of the embodiments of the invention have been shown and described in detail, other modifications, which are within the scope of this invention, including, but not limited to, the substitutions of equivalent features, materials, or parts, will be readily apparent to those of skill in the art based upon this disclosure without departing from the spirit and scope of the invention.

What is claimed is:

1. A knife, comprising:

a handle;

a blade slidably fixed within the handle that is configured to move between a forward direction to an extended state wherein the blade extends from a first end of the handle and a rearward direction to a retracted state wherein the blade is retracted within the handle, the blade having a tang external of the handle, when the blade is in the retracted state, that is contactable to aid in deploying the blade to the extended state upon an application of force applied to the tang;

a front lock that is rotatably fixed within the handle and configured to allow and prevent movement of the blade in the forward direction and the rearward direction;

a rear lock that is spaced from the front lock, rotatably fixed within the handle and configured to allow and prevent movement of the blade in the forward direction and the rearward direction;

an internal slider that is arranged within the handle, movable within the handle between the forward direction and the rearward direction and contactable with the front lock and the rear lock to aid in movement of the blade between the extended state and the retracted state; and a switch arm that is arranged within the handle, includes a main body, a curved first end and a curved second end, and interacts with the blade to aid in movement of the blade between the extended state and the retracted state.

2. The knife of claim 1, wherein the handle includes a cutout through which the tang of the blade extends in a closed state.

3. The knife of claim 1, wherein the blade includes at least one projection that interfaces with the switch arm to aid the switch arm in moving between the extended state and the retracted state.

4. The knife of claim 3, further comprising a safety arranged substantially within the handle, which is flexible and that includes at least one protrusion extending therefrom that is configured in a relaxed, non-flexed state to permit the at least one projection of the blade to slide thereover and in a flexed state to prevent the at least one projection of the blade to slide thereover and in turn prohibit movement of the blade within the handle.

5. The knife of claim 4, wherein the safety includes at least a first protrusion and a second protrusion with the first protrusion being the at least one protrusion configured to permit and prevent the at least one projection of the blade to slide thereover and the second projection extending through an opening in the handle and, upon contact, is depressible, at least in part, within the handle causing the safety to flex and prohibit movement of the blade.

6. The knife of claim 5, further comprising a clip that is fixed at a first end thereof to the handle and contactable with the handle at a second end of the clip, and the second protrusion of the safety extends through the opening in the handle between the first end and the second end of the clip.

7. The knife of claim 1, wherein the rear lock, which is rotatable, is configured to interact with the tang of the blade to prohibit the blade from traveling freely within the handle.

8. The knife of claim 1, further comprising a bridge that is configured to be mounted to the handle with a channel formed between the handle and the bridge, and an axle arranged within the channel and slidable between a forward position and a rearward position with the axle and the bridge configured to aid in changing a grip on the knife when deploying and retracting the blade.

9. The knife of claim 1, wherein the tang in the retracted state does not extend beyond the length or height of the handle such that when the tang protrudes from the handle, it does not add to the overall dimensions of the knife.

10. The knife of claim 1, wherein travel of the blade is dependent upon inertia imparted upon said tang.

11. The knife of claim 1, wherein, in the retracted state, the curved first end of the switch arm is in contact with the front lock, holding the front lock in an open state while the rear lock is in a locked state, interacting with the blade and preventing movement of the blade, and when the application of force is applied to the tang causing the blade to move toward the extended state, the switch arm moves in concert with the blade beyond the front lock causing the front lock to rotate to a locked state, preventing the switch arm and the blade to move to the retracted state while the rear lock is rotated to an open state to allow the blade to move to the extended state.

12. A knife, comprising:

a handle;

a blade, which includes at least one projection extending therefrom, slidably fixed within the handle that is configured to move between an extended state wherein the blade extends from a first end of the handle and a retracted state wherein the blade is retracted within the handle, the blade having a tang external of the handle that is contactable to aid in deploying the blade to the extended state; and a safety having a main body, which is flexible, fixed within the handle, a protrusion extending from the main that is configured in a relaxed, non-flexed state to permit the at least one projection of the blade to slide between the extended state and the retracted state and in a flexed state to prevent the at least one projection of the blade to slide between the extended state and the retracted state, prohibiting movement of the blade within the handle.

13. The knife of claim 12, wherein the safety includes a second protrusion that extends from the main body of the safety and, in part, projects through an opening in the handle, upon an application of force, the second protrusion causing the main body of the safety to flex and prohibit movement of the blade.

14. The knife of claim 13, further comprising a clip that is fixed at a first end of the clip to an external surface of the handle and contactable with the external surface of the handle at a second end of the clip, the second protrusion of the safety extending through the opening in the handle between the first end and the second end of the clip.

15. A knife, comprising:

a handle;

a blade slidably fixed within the handle that is configured to move between an extended state wherein the blade extends from a first end of the handle and a retracted state wherein the blade is retracted within the handle, the blade having a tang external of the handle that is contactable to aid in deploying the blade to the extended state;

a bridge that is configured to be mounted to the handle with a channel formed between the handle and the bridge; and an axle arranged within the channel and slidable between a forward position and a rearward position with the axle and the bridge configured to aid in changing a grip on the knife when deploying and retracting the blade.

* * * * *